May 24, 1960
H. J. RICHMAN, JR
2,937,887
REMOTELY CONTROLLED TRAILER HITCH AND STAND
Filed May 7, 1957
3 Sheets-Sheet 1
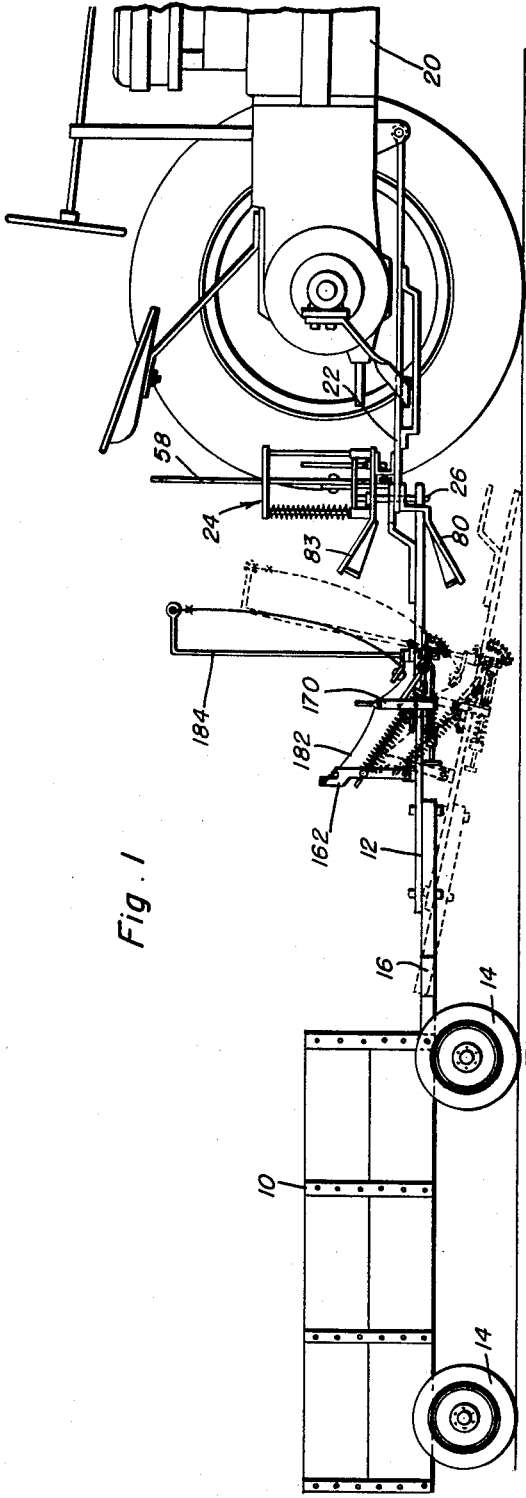
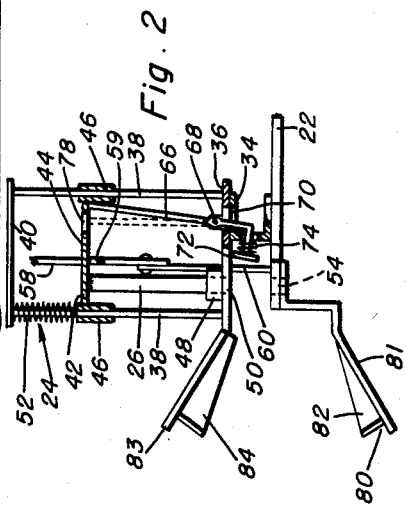
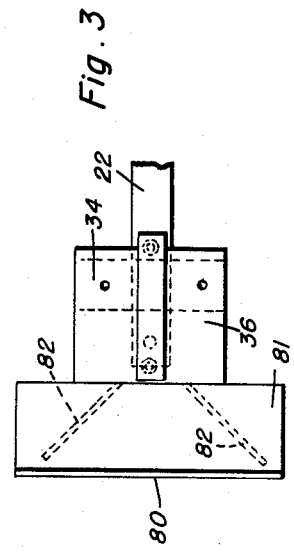
Henry J. Richman, Jr.
INVENTOR.
BY
Attorneys May 24, 1960  H. J. RICHMAN, JR  2,937,887
REMOTELY CONTROLLED TRAILER HITCH AND STAND
Filed May 7, 1957  3 Sheets-Sheet 2
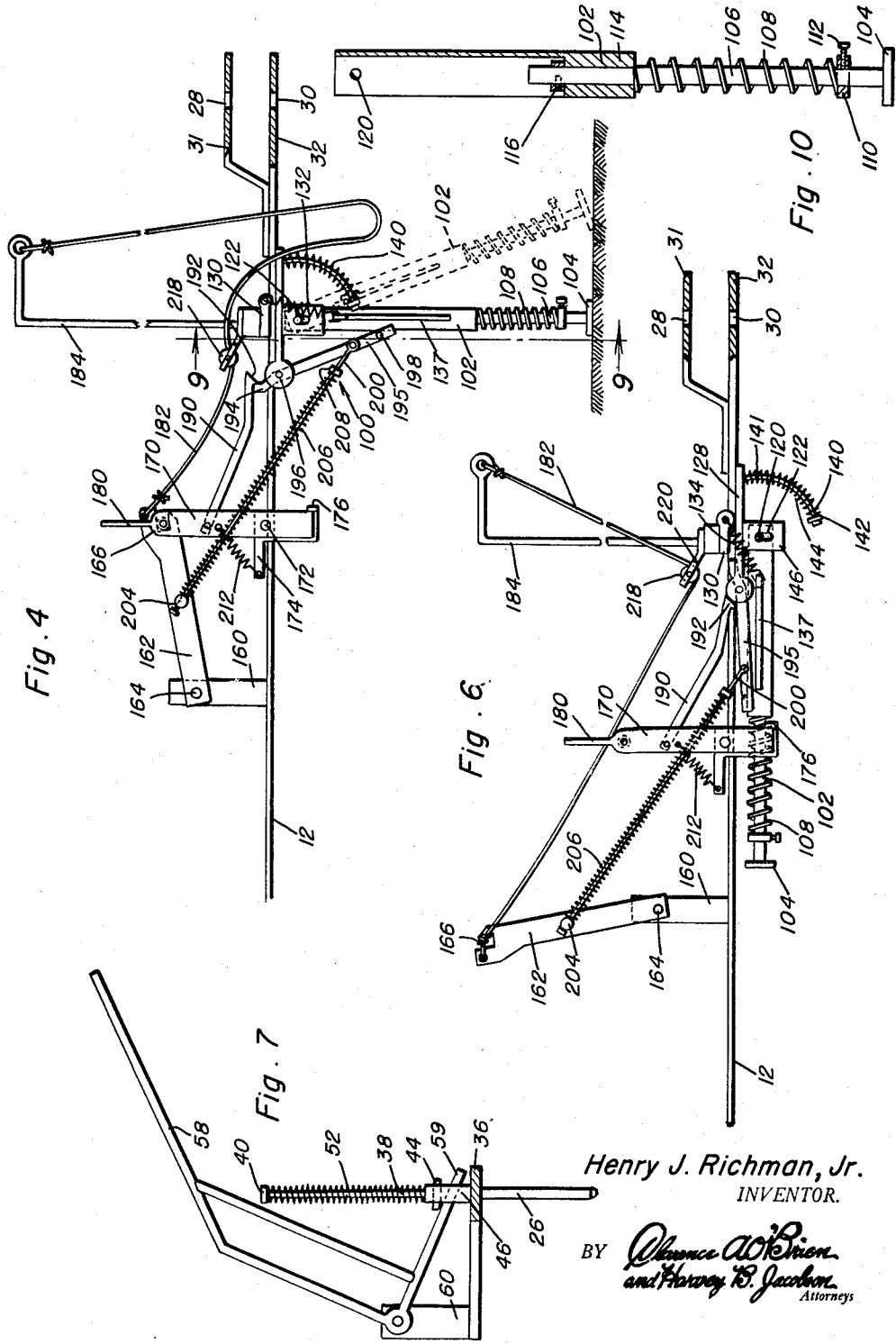
Henry J. Richman, Jr.
INVENTOR.

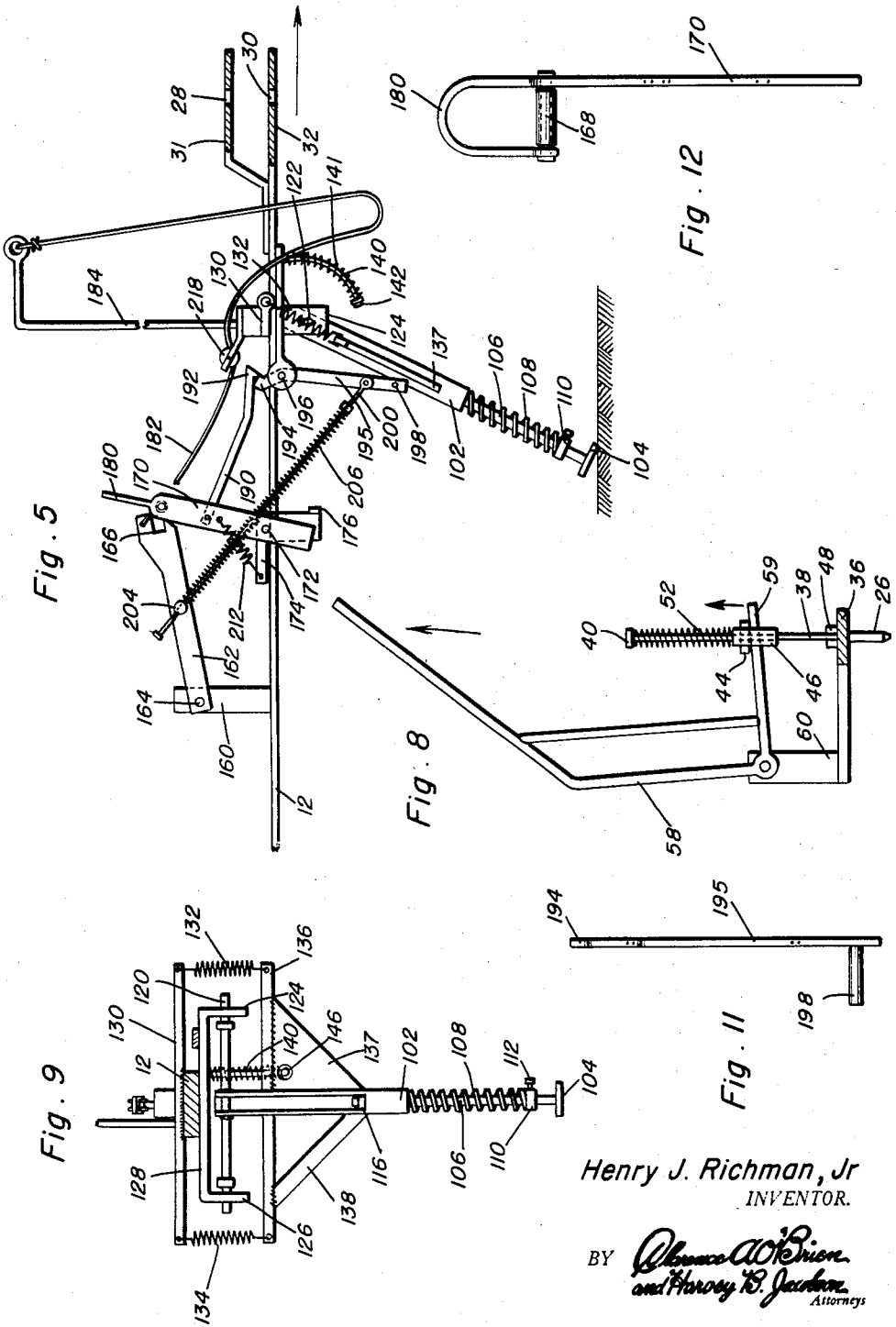

United States Patent Office 2,937,887
Patented May 24, 1960

2,937,887

REMOTELY CONTROLLED TRAILER HITCH AND STAND

Henry J. Richman, Jr., Tower City, N. Dak.

Filed May 7, 1957, Ser. No. 657,648

3 Claims. (Cl. 280—508)

This invention relates to a remotely controlled trailer hitch and stand for farm implements, particularly those which are customarily attached to a tractor and drawn in this manner.

An object of the invention is to provide a practical remotely controlled trailer hitch and stand which enables the tractor operator to couple and uncouple a towed implement, vehicle or the like without unseating from the tractor. Although prior hitches have been capable of this functioning, my invention accomplishes this by a novel structure and in a far more dependable way.

A further object of the present invention is to provide a trailer hitch and stand which can be applied to small vehicles and large vehicles with equal facility and success. The principles of operation and the structural features are such that the parts may be enlarged or reduced in proportion to each other whereby various sizes of stands in accordance with the invention, may be constructed and used with not only different sizes of tractors and drawn implements, wagons, etc., but also the hitch may be applied to different types of equipment. For example, although I have illustrated a wagon in the drawing as being one implement which may be drawn, it is clearly understood that other types of equipment may be drawn by the tractor and may be coupled thereto by a hitch of my invention.

A further feature of importance concerning the invention is in the construction where the stand is capable of being slightly angled and tilted when the hitch is being used. In this way should the terrain be angled or should the tractor engage the implement at a slight angle, the stand in the hitch will yield and flex slightly. The result is that another of the objects of the invention is achieved. This is that the invention be mechanically constructed so that it is durable and so that it will withstand all ordinary shocks without breaking. Structurally, this is achieved by having certain lost motion between a number of the parts.

Another object of the invention is to provide a hitch of the type that is to be described, wherein the stand automatically is lowered and raised in accordance with the necessities, the stand being actuated by at least one spring and preferably a pair of springs, which are arranged in over-pivot-center relationship to the stand thereby providing a toggle action.

Other objects and features of importance will become apparent following the description of the illustrated form of the invention.

Figure 1 is an elevational side view of a typical implement, a wagon in this case, a remotely controlled trailer hitch and stand constructed in accordance with the invention, this being shown in the engaged position with a fragmentary part of an ordinary tractor and shown in a disengaged position in dotted line;

Figure 2 is a transverse sectional view through the pin control device which is mounted on the tractor, this device locking the pin in a retracted position and releasing the pin to be forcibly ejected by spring pressure into engagement with the tongue of the implement in response to the entry of the outer extremity of the tongue into the pin controlled device triggering station;

Figure 3 is a bottom view of one of the guides by which the tongue of the implement is directed into the pin control device triggering station;

Figure 4 is an elevational view of the part of the trailer hitch and stand which is mounted on the tongue of the implement, this view showing the hitch in a position with the stand down and showing in dotted line position the extent of travel in one direction of the stand;

Figure 5 is an elevational view similar to Figure 4 but showing the stand in a position where the various locks are just being released and the stand is being spring returned to the completely elevated position, this being accomplished automatically in response to slight forward movement of the tractor;

Figure 6 is an elevational view of the hitch but showing the same with the stand fully retracted;

Figure 7 is a sectional view showing the manually operable means to lift the locking pin from engagement with the tongue of the implement, the manual lifting means being shown in one position;

Figure 8 is a sectional view similar to that of Figure 7 but showing the pin lifting means in an elevated position;

Figure 9 is a sectional view taken on the line 9—9 of Figure 4 and showing principally the arrangement of springs which are used to hold the stand in both a down and an up position, the springs being arranged in an overcenter, toggle relationship with the stand;

Figure 10 is an enlarged sectional view of the stand showing the spring loaded foot thereof;

Figure 11 is a side view of one of the locking members through which the pull rope is passed; and Figure 12 is a view at right angles to Figure 11.

In the accompanying drawings there is a towed implement 10. Although this implement may assume various forms, types or configurations, the illustration is of a wagon that has a tongue 12 together with wheels 14 by which the wagon is supported. The tongue 12 is carried by a horizontal pivot 16 so that it is capable of moving up and down about the axis of pivot 16. Tractor 20 is fragmentarily shown, this tractor having an ordinary drawbar 22 on which control device 24 is supported. The control device is for the purpose of vertically raising or lowering locking pin 26 that is movable into the aligned holes 28 and 30 (Figure 5) formed in the upper and lower members 31 and 32 of the tongue 12.

Pin control device 24 is made of a transverse channel 34 that is attached to drawbar 22 and on which base plate 36 is fixed. Vertical rods 38 are attached to base plate 36 and rise therefrom. The upper ends are connected by cross-member 40 and there is a vertically movable carrier 42 disposed on rods 38. This carrier is formed of a plate 44 that has sleeves 46 welded or otherwise attached to it and slidable on rods 38. Locking pin 26 is welded to the bottom of carrier 44 and is passed through a guide 48 that is aligned with hole 50 in base 36, through which pin 26 is adapted to pass. Spring 52 is concentrically arranged on one of the rods 38 and seats against member 40 and either carrier 44 or one of the sleeves 46 thereof whereby the carrier together with its pin 46 are constantly pressed downwardly in a direction to pass the pin through the registered holes 50, 28, and hole 54 in drawbar 22.

There are means to manually elevate the carrier 44 and its pins 26. These means consist of a hand lever 58 which is located convenient to the tractor operator and which has an end 59 located beneath carrier 44. By moving the lever 58 in one direction, the carrier and pin is elevated thereby separating it from engagement in the previously mentioned holes. In order to support the lever 58 in proper position, a mounting bracket 60 is attached to the base 36.

A lock bar 66 is connected by a horizontal pivot 68 to base 36 and is passed through apertures 70 in channel 34 and base 36. The lower end of the lock bar is located in the pin control device trigger zone and has a wear plate 72 thereon against which the upper member 31 of tongue 12 is adapted to strike. Spring 74 reacts on the wear plate 72 and on channel 34 thereby constantly, resiliently biasing the locking rod 66 in one direction and opposing the pivotal movement of the locking rod.

There is a hole 78 formed in plate 44 through which the opposite end of the locking rod 66 is adapted to pass. The function of locking rod 66 is to hold the carrier 44 elevated thereby holding locking pin 26 in the elevated position (Figure 2). But, when the tongue is engaged with the wear plate 72, locking rod 66 is pivotally swung to a position where its upper end becomes aligned with aperture 78. At this position springs 52 forcibly projects the carrier 44 downwardly and since, at this time, the holes 28 and 30 in the tongue are aligned with holes 50 and 54, the locking pin 26 becomes engaged therewith.

There is a guide 80 in registry with the trigger station for the control device 24. The guide consists of a lower angulated plate 81 which is attached to drawbar 22 and which has outwardly diverging ribs 82 formed on the upper surface thereof. An upwardly inclined plate 83 is attached to base 36 and is superposed and spaced from plate 81. Outwardly divergent ribs 84 are on the lower surface of plate 83. The plates and their ribs permit reasonable misalignment between the control device 24 and the end of the tongue and yet guide the tongue into the trigger station enabling spring 52 to forcibly eject the locking pin 26 into the locked position with respect to the tongue 12.

There is the stand 100 carried by tongue 12, this stand being adapted to be automatically actuated as described subsequently. The stand is composed of a post 102 which has a foot 104 at the lower end adapted to have ground contact. Push rod 106 is attached to foot 104 and has spring 108 concentrically arranged thereon and seated on collar 110. This collar is held by a setscrew 112 in a selected, adjusted position on rod 106. The opposite end of the spring bears against the sleeve 114 whose upper end is channeled to accommodate the adjustable stop 116 that is fixed to the rod. Transverse pivot pin 120 is welded or otherwise secured to the post 102 and is passed through slots 122 (Figure 4) formed in the two depending ears 124 and 126 or transverse support plate 128. The support plate is welded to tongue 12 (Figure 9) below transverse arm 130 which is also welded to the tongue. Springs 132 and 134 are secured at their upper ends to arm 130 and are secured at their lower ends to transverse arm 136 that is fixed and braced by braces 137 and 138, to the post 102. The springs 132 and 134 are so attached that when the post is swung in one direction, the springs will move over the pivot center established by slots 122 and pivot pin 120 thereby tending to further swing the post 102. But, when the post is swung in the opposite direction, for example from the position shown in Figure 4 to the position shown in Figure 5, the springs 132 and 134 will move over the pivot center of post 102 and again aid in swinging the post 102 to the position shown in Figure 6. When swinging toward the tractor (dotted line position of Figure 4) the motion is arrested by shock absorber 140 which consists of an arcuate rod 141 welded to plate 128 and having a stop 142 slidably disposed thereon. Spring 144 abuts plate 128 and the stop 142 constantly pressing it to the outer extremity of the arcuate rod. Therefore, when the post 102 is moved to the dotted line position of Figure 4, stop 142 comes to bear against the surface of brace 137 and the extremity of the arcuate rod 141 passes through a hole 146 formed in the brace 137. The result is that spring 140 is compressed thereby providing a shock absorber and motion arresting means for post 102.

The post 102 being in the upright position of Figure 4 is held there until released, as by backing the tractor up and coupling the hitch which includes pin control device 24. If this happens the tractor operator can move the tractor forward thereby causing the post 102 to be swung to the position shown in Figure 5 with the spring loaded foot 104 assuring ground contact until this position is achieved. The means to hold the post 102 erect are overcome by being released. These means consist of a support 160 which is attached to tongue 12 together with a locking arm 162 which is pivoted at 164 to support 160. The outer end of arm 162 has a notch 166 which accepts the roller 168 (Figure 12) of the rocker 170. This rocker is pivoted on a pin 172 carried by hanger 174, the latter being attached to tongue 112. Stop 176 on hanger 174 is contacted by the lower end of rocker 170 thereby limiting the travel of the rocker in one direction. The upper end of rocker 170 has a loop 180 formed in it through which the pull rope 182 is passed. The end of the pull rope is attached to an upright 184 that is attached to plate 130 while the opposite end of the pull rope 182 is attached to the extremity of arm 162. A lever 190 is pivoted to the rocker 170 between the ends of the rocker. Dog 192 is at the end of lever 190 and engages the keeper 194 on the upper extremity of lever 195. The lever is pivoted on pin 196 between the ends of the lever and has keeper 194 disposed above the tongue 12 so as to be engageable by dog 194. In addition lever 195 is pivoted by pin 198 to the post 102. Push rod 200 is pivoted to the lever 195 and passes through a passage in rotatable boss 204 on arm 162. Spring 206 is concentrically arranged on push rod 200 and seats against the adjustable collar 208 on the push rod 200 and against the boss 204.

As post 102 moves from the position shown in Figure 4 to the position of Figure 5, lever 195 is swung about pivot 196 and is disengaged from lever 190 by having dog 192 slipped from keeper 194. The position where the dog is just about slipping off the keeper as shown in Figure 5. At the same time spring 206 is compressed by movement of push rod 200 toward arm 162 and this tends to swing arm 162 counterclockwise (Figure 5) while at the same time rocker 170 is being freed from notch 166 so that the arm 162 can actually be swung counterclockwise by the compressive energy stored in spring 106. Rocker 170 is actually disengaged from notch 166 by a pulling force applied by lever 190, this pulling force being generated by the swinging movement of lever 195 when the dog 192 and keeper 194 are being disengaged from each other. When the disengagement of roller 168 and notch 166 is complete, the rocker 170 will have swung to a slightly angulated position with respect to a vertical plane and the arm 162 will be free to swing to an upright position (Figure 6). Rocker 170 is returned to the vertical position against stop 176 by spring 212 which is attached to hanger 174 and which is attached to the rocker 170 above its pivot 172.

In this condition, the implement 10 is capable of being drawn by the tractor without interference from any part of the stand.

When the implement tongue 12 is to be released, the tractor operator merely reaches back and pulls on the pull rope 182. This rope is guided by pulley 218 that is carried by a mounting bracket 220 on plate 130 and also guided by eye 180. Arm 162 is pivotally swung downward with push rod 200 forcing lever 195 to a down position. This causes lever 190 to be engaged with lever 195 through the dog and keeper interlocking. Meanwhile the notch 166 accepts roller 168 and springs 132 and 134 pass the overcenter pivotal position for post 102 and pull the post to the vertical position. The stand will remain in this position until the procedure for returning the same is commenced, this procedure having been described previously.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A remotely controlled trailer hitch adapted to be fastened to a tractor, said hitch comprising a locking pin, a carrier to which said locking pin is secured, a base, means on said base and contacting said carrier for constraining the movement of said carrier, a spring reacting on said carrier and applying a force to said carrier in a direction to project said pin in one direction, said base having an aperture through which said pin is adapted to move, a locking rod pivotally carried by said base and in contact with said carrier to hold said carrier in a cocked position, and means responsive to movement by the part to be hitched for moving said locking rod to a position to release said carrier enabling said spring to forcibly move said carrier and pin with said pin moving through said aperture to engage with the device that is to be hitched, said carrier having an aperture with which said locking rod is aligned when said locking rod is moved to the carrier releasing position, a trigger station below said base, and means including a wear plate and spring and located in said station for yieldingly retaining said rod in the position of holding said carrier in a cocked position.

2. A remotely controlled trailer hitch adapted to be fastened to a tractor, said hitch comprising a locking pin, a carrier to which said locking pin is secured, a base, means on said base constraining the movement of said carrier, a spring reacting on said carrier and applying a force to said carrier in a direction to project said pin in one diection, said base having an aperture through which said pin is adapted to move, a locking rod pivotally carried by said base and in contact with said carrier to hold said carrier in a cocked position, means responsive to movement by the part to be hitched for moving said locking rod to a position to release said carrier enabling said spring to forcibly move said carrier and pin with said pin moving through said aperture to engage with the device that is to be hitched, said carrier having an aperture with which said locking rod is aligned when said locking rod is moved to the carrier releasing position, a trigger station below said base, means including a wear plate and spring located in said station for yieldingly retaining said rod in the position of holding said carrier in a cocked position, a lever pivoted to said base and having an end in engagement with said carrier enabling the tractor operator to manually elevate said carrier and retract said locking pin from said station and move said carrier to a position freeing said locking rod so that the spring connected therewith deflects said rod to a non-aligned position with the aperture in said carrier.

3. A remotely controlled trailer hitch adapted to be fastened to a tractor, said hitch comprising a locking pin, a carrier member to which said locking pin is secured, a base member, a spring reacting on said carrier member and applying a force to said carrier member in a direction to project said pin in one direction, said base member having an aperture through which said pin is adapted to move, a locking rod pivotally carried by one of said members and in contact with the other of said members to hold said carrier member in a cocked position, and means responsive to movement by the part to be hitched for moving said locking rod to a position to release said carrier member enabling said spring to forcibly move said carrier member and pin with said pin moving through said aperture to engage with the device that is to be hitched, said other member having an aperture with which said locking rod is aligned when said locking rod is moved to the carrier member releasing position, a trigger station below said base, means including a wear plate located in said station and a spring for yieldingly retaining said rod in the position of holding said carrier member in a cocked position, and means including a lever pivotally mounted with respect to said base for contacting said carrier to move said locking pin in an opposite direction and to move said carrier into said cocked position thus to allow said locking rod to move into said cocked position.

References Cited in the file of this patent

UNITED STATES PATENTS

| | | |
|---|---|---|
| 2,207,812 | McClellan | July 16, 1940 |
| 2,225,157 | Court | Dec. 17, 1940 |
| 2,309,618 | Hyland et al. | Jan. 26, 1943 |
| 2,441,285 | Pfeiffer | May 11, 1948 |
| 2,442,439 | Schultz | June 1, 1948 |
| 2,478,736 | Balzer | Aug. 9, 1949 |
| 2,525,471 | Balzer | Oct. 10, 1950 |
| 2,788,227 | Wallace | Apr. 9, 1957 |

FOREIGN PATENTS

| | | |
|---|---|---|
| 488,969 | Germany | Jan. 10, 1930 |
| 639,396 | Germany | Dec. 4, 1936 |